(12) United States Patent
Weldemariam et al.

(10) Patent No.: US 11,144,884 B2
(45) Date of Patent: Oct. 12, 2021

(54) CONTEXTUALIZED ITEM REMINDER ASSITANCE

(71) Applicant: International Business Machines Corporation, Armonk, NY (US)

(72) Inventors: Komminist Weldemariam, Nairobi (KE); Abdigani Diriye, Nairobi (KE); Jonathan Lenchner, North Salem, NY (US)

(73) Assignee: International Business Machines Corporation, Armonk, NY (US)

( * ) Notice: Subject to any disclaimer, the term of this patent is extended or adjusted under 35 U.S.C. 154(b) by 86 days.

(21) Appl. No.: 16/197,456

(22) Filed: Nov. 21, 2018

(65) Prior Publication Data
US 2020/0160277 A1    May 21, 2020

(51) Int. Cl.
G06Q 10/10    (2012.01)
G06N 20/00    (2019.01)
G10L 15/26    (2006.01)

(52) U.S. Cl.
CPC ......... G06Q 10/1093 (2013.01); G06N 20/00 (2019.01); G10L 15/26 (2013.01)

(58) Field of Classification Search
None
See application file for complete search history.

(56) References Cited

U.S. PATENT DOCUMENTS

| | | | | |
|---|---|---|---|---|
| 6,662,078 B1 * | 12/2003 | Hardgrave | ............. | G06Q 10/02 700/226 |
| 2008/0127231 A1 | 5/2008 | Shaffer et al. | | |
| 2008/0204233 A1 * | 8/2008 | Agrawal | ................ | G06Q 10/08 340/572.1 |
| 2011/0258153 A1 * | 10/2011 | Kamar | ................. | G06Q 10/109 706/12 |
| 2014/0074483 A1 | 3/2014 | Van | | |
| 2016/0351194 A1 | 12/2016 | Gao et al. | | |
| 2017/0098284 A1 * | 4/2017 | Schneider | .............. | G06Q 50/01 |

OTHER PUBLICATIONS

Kanjanatarakul et al. (An Evidential K-Nearest Neighbor Classifier Based on Contextual Discounting and Likelihood Maximization, International Conference on Belief Functions, BELIEF 2018: Belief Functions: Theory and Applications pp. 155-162, 2018).*

\* cited by examiner

*Primary Examiner* — Matthew D Henry
(74) *Attorney, Agent, or Firm* — Shimon Benjamin; Otterstedt, Wallace & Kammer, LLP

(57) ABSTRACT

Systems and methods for reminding a user or a group of users about one or more items related to an upcoming event. The upcoming event is identified based on user data and a context for determining a list of items useful for the upcoming event is obtained. The list of items for the identified upcoming event is determined, using the context, and item reminder enhancement factors are determined in response to the upcoming event and the determined list of items. Content selection models are determined based on the context, the user data, and the item reminder enhancement factors. Conversational content for engaging the user or group of users is generated by applying the content selection models to a plurality of potential content. A conversation trigger signal is determined, and the conversational content is presented to the user via a computing device in response to receiving the conversation trigger signal.

18 Claims, 9 Drawing Sheets

FIG. 3

KEY:
IL=IMPORTANCE LEVEL
PL=PRIORITY LEVEL
ToR=TIME TO REMIND A USER
SI=SENSITIVITY INDEX OF ITEM
PF=PROBABILITY OF FORGETTING AN ITEM
IC=IMPLICATION COST
Ans=ANSWER TO A GIVEN CONVERSATION CONTENT
R=RELATIVE RANKING

TRAVEL/TRIP: NEW YORK TO NAIROBI VIA ADDIS ABABA (LAYOVER 9 HRS)
EVENT: WORK, CLIENT SITE,
PREREQUISITES: YELLOW FEVER

MISCELLANEOUS DATA SOURCES (INC. USER PROFILE)

KNOWN ITEMS ASSOCIATED WITH THE TRAVEL: COMPUTER CHARGER, PHONE/PHONE CHARGER, KENYAN SIM, CONVERTER, WALLET, SUIT, YELLOW FEVER CARD, GREEN CARD; CONVERSATION SUGGESTED THE USER WILL BE IN SAFARI;

USER PROFILE: BUSY AND INATTENTIVE PERSON, HISTORICALLY KNOWN IN FORGETTING ITEMS, SPENT $600 ON BUYING (ON-FORGOTTEN) ITEMS IN THE LAST 6 MONTHS, etc.

FORGOTTEN YELLOW FEVER CARD 3 TIMES AND WALLET 1 TIME.
AVERAGE TIME SPENT ON FINDING GREEN CARD 2HRS.
IGNORED REMINDERS FOR CHARGES AND BELTS MULTIPLE TIMES;
DISTANCE BETWEEN A USER HOME AND THE AIRPORT: 45 MILES

{<Suit, IL=1, PL=1, ToR=1 Day, SI=0, PF=0.5, IC=Medium>, <Shoes, IL=1, PL=1,ToR=24hrs, SI=0, PF=0.6, IC=Low>, <Charger, IL=0.8, PL=0.7, ToR=5hrs SI=0, PF=0.8, IC=Minor>, <Green Card, IL=1, PL=1, ToR=7hrs, SI=0, PF=0.6, IC=High>, ...}

DETERMINE AND IDENTIFY ITEM SET MODEL

GENERATE CONVERSATIONAL CONTENTS MODEL

{<Did you put an adaptor for Kenyan?, R=4, Ans=NO>, <Do you have your Yellow Fever Card?, R=2, Ans=NO>, <Do you have your Green Card?, R=1, Ans=NO>, <Do you have your notebook with you?, R=7, Ans=NO>, ...};

IDENTIFY CONVERSATION TRIGGERS MODEL

{Content: {<Do you have your Green Card?>, <Do you have your Yellow Fever Card?>};
Device: {<Use personal smart device at 07.00 and 18.00>, <Use Sri each time a user Search>}, ...}

ANALYZED USER ENGAGEMENT AND INTERACTION MODELS WITH CONVERSATION DEVICES AND/OR SYSTEMS

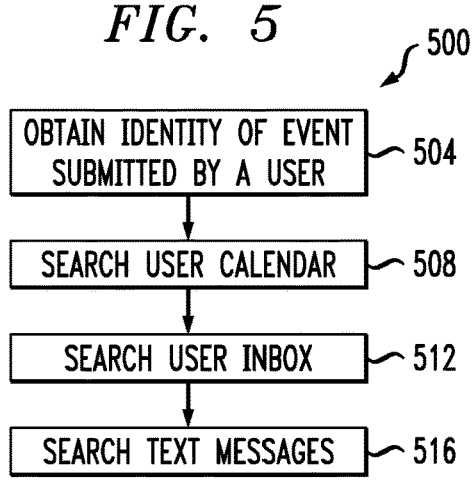
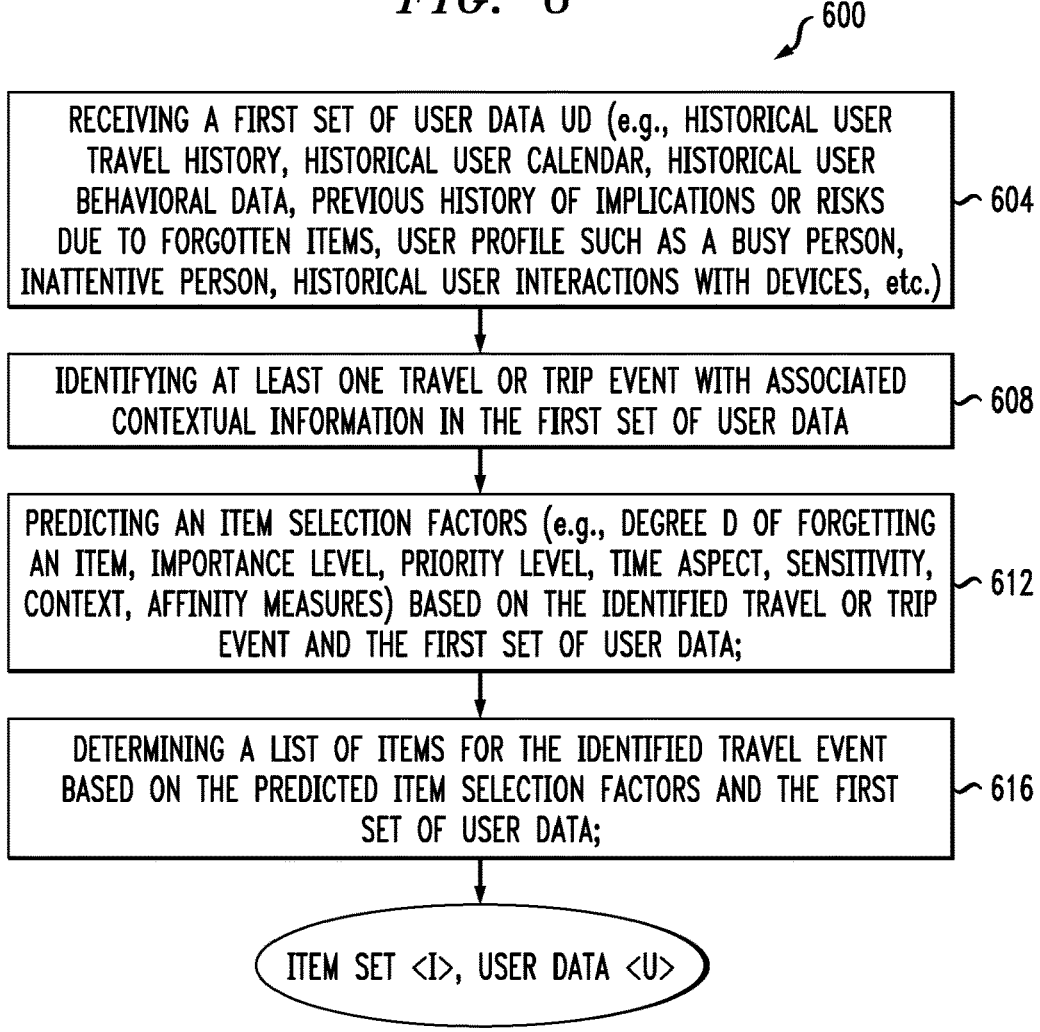

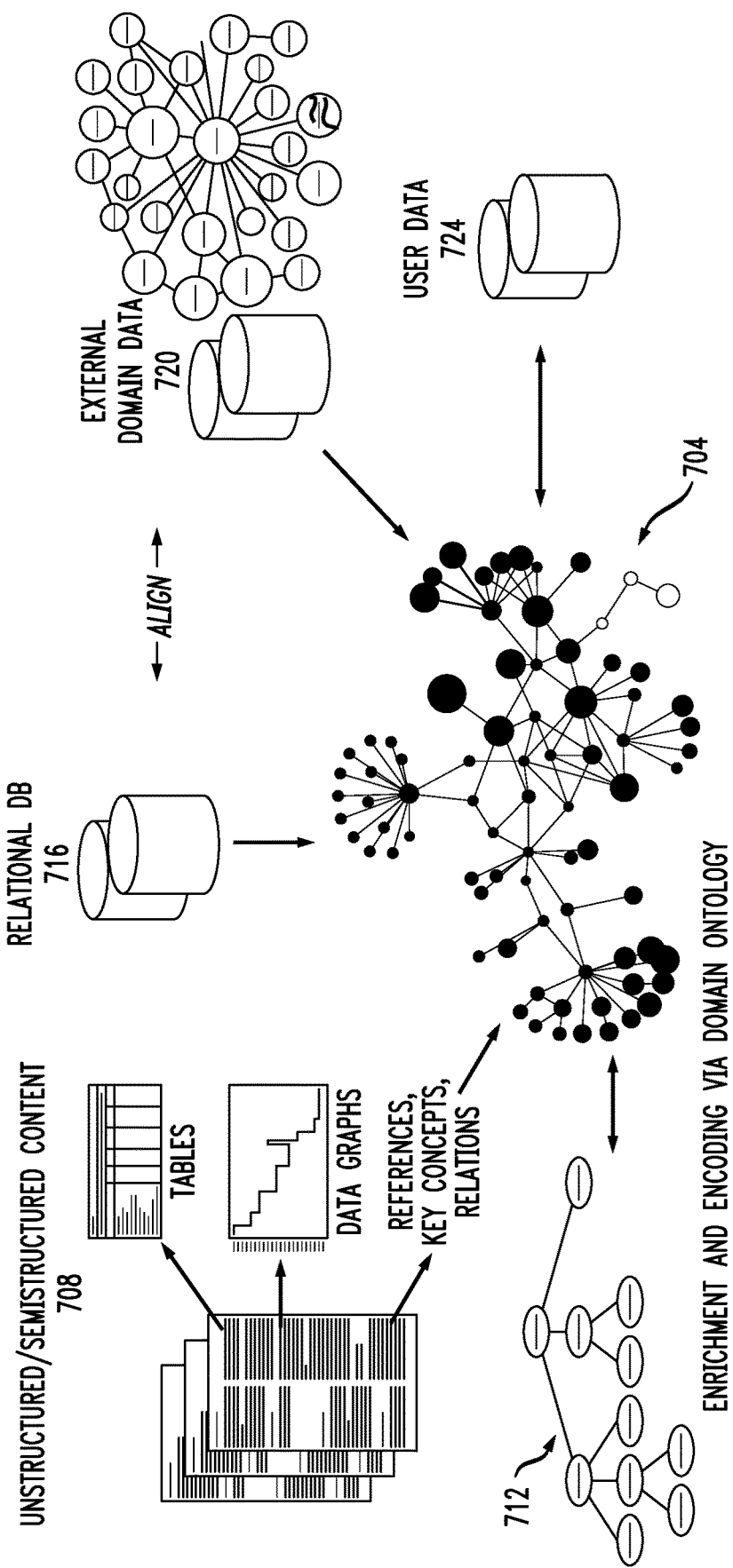

CONTEXTUALIZED ITEM REMINDER ASSITANCE

TECHNICAL FIELD

The present invention relates to the electrical, electronic, and computer arts, and more specifically, to generating a reminder for an item.

BACKGROUND

It is well known that the memory of individuals is not perfect. People tend to forget items or objects, or forget performing certain tasks, when they prepare to leave their house, office, hotel or, generally, any location. Examples of such items include a computer charger, a power converter, a wallet, a suit, an identification card, a phone charger, a notebook, a picture, or other objects that may be important or relevant for a given context. Tasks may include pre-boarding an airline flight, making a hotel reservation, and the like. Depending on the user profile or context (such as a busy person, an inattentive person, a location, an event type, and the like), the degree of forgetting such items and tasks may vary. For instance, some users may remember to pack a "suit," but may forget to pack a suitable "belt"; some users may forget their wallet. Some users may not select items that are relevant or essential for the defined context, such as the context associated with a destination or location, the context of an event, and the like. In the real world, there are many types or categories of items and tasks that may be forgotten depending on the user context, event context, user profile, and the like. It can be a challenge to inform a system about items that may be forgotten.

In one example scenario, a vast filtering system is utilized at one train station in London (the Baker Street train station) to collect the items left behind as people flow through the city's transit system each day. The cost to the city is sixty-five staff employees sorting through hundreds of thousands of lost and forgotten items at the depot, which costs consumers' tens of millions of dollars. According to the transparency data, the Baker Street Lost and Found team sorted through 332,077 items during the first three months of 2018. According to the team, an accurate price for what it costs to return each item is £100, illustrating the cost of loss. The data reveals that very few items are claimed. Overall, 20% of the stock is claimed within three months; after that time, the stock passes into the city's possession.

Individuals often remember their forgotten items when seeing other relevant or related objects (such as, when a user pulls out his computer, the user may remember a power charger or power convertor; when a user pulls out a suit, the user may remember the appropriate pair of shoes, and the like). Such recollection, however, can come too late to mitigate the situation, either while traveling to the destination or after arrival.

SUMMARY

Embodiments of the present disclosure provide a platform for reminding users about items for a given event, such as a travel or trip event. In one example embodiment, the platform is a conversational platform and the item is a physical item, a task to be performed, and the like. The reminders are based on an understanding of a plurality of contexts and attributes pertaining to "forgetting an item or task," known as item reminder enhancement factors herein. In one example embodiment, conversational content is generated, and a user or group of users is contextually probed with the conversational content to obtain information associated with an event.

In one example embodiment, a method and system for assisting a user or group of users in planning, preparing for, and participating in an upcoming event is disclosed. The event may be a travel event, a trip, a conference, a work event, and the like. In an example embodiment, an upcoming event of a user or groups of users is received; a set of items related to the event for which the user or groups of users are to be reminded is determined; item reminder enhancement factors are determined in response to the upcoming event and the determined list of items; conversational content is generated based on features, characteristics and affinity measures of the items and by applying content selection models to a plurality of potential content; a conversational trigger signal is determined; and the user or groups of users are contextually probed with the conversational content. The probing is conducted via one or more text/voice-based devices, a conversational system, and the like. The conversational content is, for example, questions, dialog, text or voice-based checklists, and the like. The conversational trigger signal is, for example, an interaction of a user with a device, sensing the user based on a proximity sensor, detecting an expiration of a time trigger, receiving text generated using voice recognition, and the like. In an example embodiment, items that are missed by the user are dynamically routed to, for example, the user. The routing of the items is based, for example, on the degree of importance of the item.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of:

using historical data to understand, for a given user, what items are typically useful but often forgotten for a given event;

automatically triggering scenario planning to determine suitable ameliorating processes once an item is recognized to be lost;

employing machine learning (ML) algorithms or techniques (such as, predictive models) to (a) estimate the cost of forgetting an item, (b) estimate the probability that certain items will be forgotten, and (c) compute the risk associated with losing such items;

developing or using machine learning models to generate contextualized conversational content as an effective and natural way of engaging with users by issuing reminders of items that might be forgotten for a given event; and employing machine learning models to determine at least one conversational trigger for issuing contextualized conversations, issuing reminders to a user, and controlling user devices based on contextual information (such as priority level, location, a time/duration of the event, a predicted task associated with the event, an event type, a service, and the like) related to the conversational content, an analysis of a user's feedback, or both.

These and other features and advantages of the present invention will become apparent from the following detailed description of illustrative embodiments thereof, which is to be read in connection with the accompanying drawings.

BRIEF DESCRIPTION OF THE DRAWINGS

FIG. 3 is an illustration of an example event scenario, in accordance with an example embodiment;

FIG. 5 is a flowchart of an example method for identifying an event, in accordance with an example embodiment;

FIG. 6 is a flowchart of an example method for generating and identifying a list of items associated with an event, in accordance with an example embodiment;

FIG. 7 is an illustration of an example dataflow for generating a knowledge graph for mapping events and tasks, in accordance with an example embodiment;

DETAILED DESCRIPTION

Figure 1:
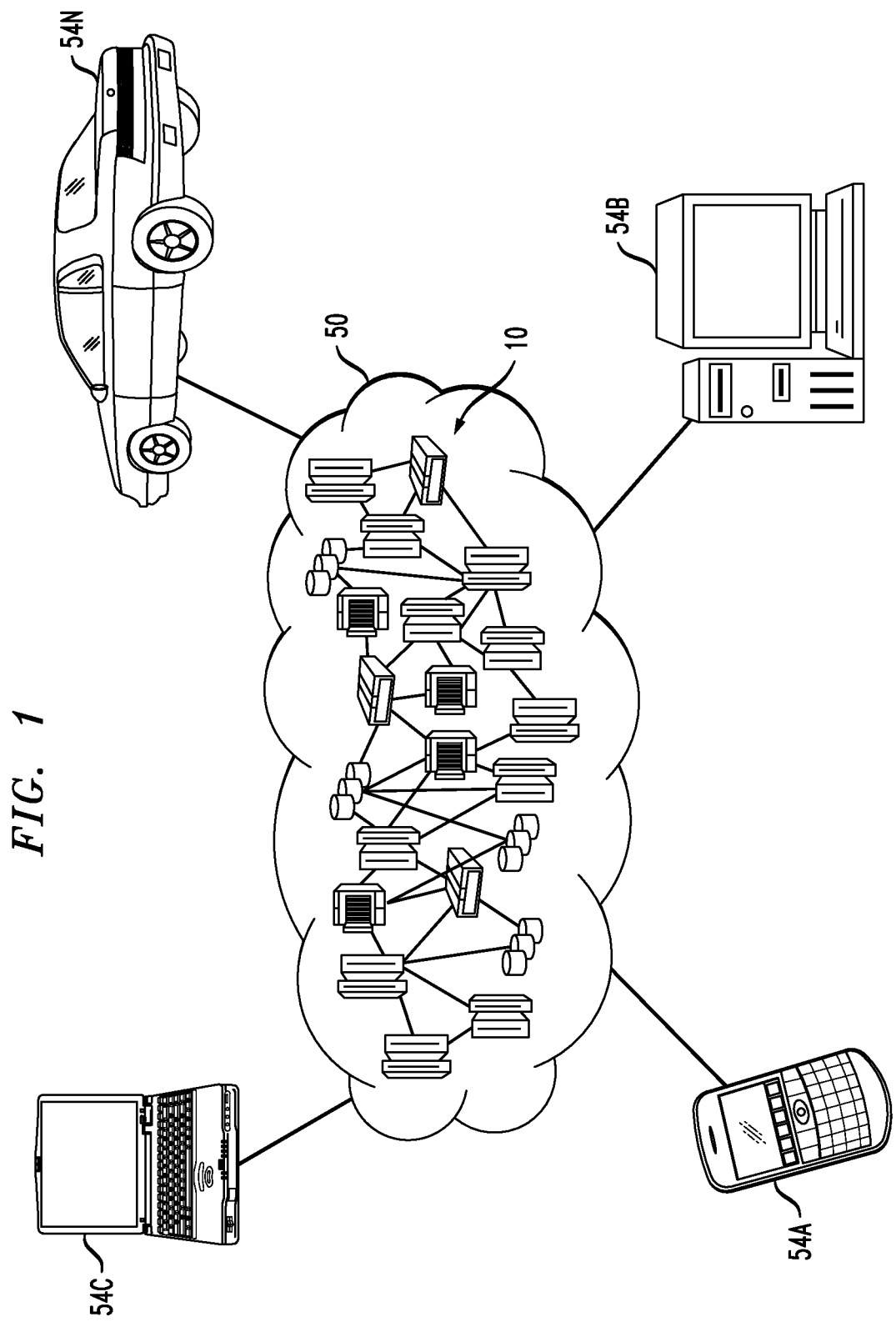
FIG. 1 depicts a cloud computing environment according to an embodiment of the present invention.

In one example embodiment, an intelligent system, such as a conversational platform, is configured on a computing device (such as a cellular phone and the like), a voice-enabled device (such as Alexa®, Google Home™, and the like—hereinafter a conversational device), a sensor, a device available in a smart home, a vehicle, and the like to automatically engage a user with conversational content. In situations where items have been forgotten, the intelligent system creates amelioration actions that can dynamically identify forgotten items, replacement items, or both; and trigger the delivery of the forgotten items, replacement items, or both. For example, a neighbor of the user who is available to deliver or transport the item may be identified, a replacement item and pick-up location may be identified, transportation and delivery options by a courier may be arranged (for picking up and delivering the item), and the like.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
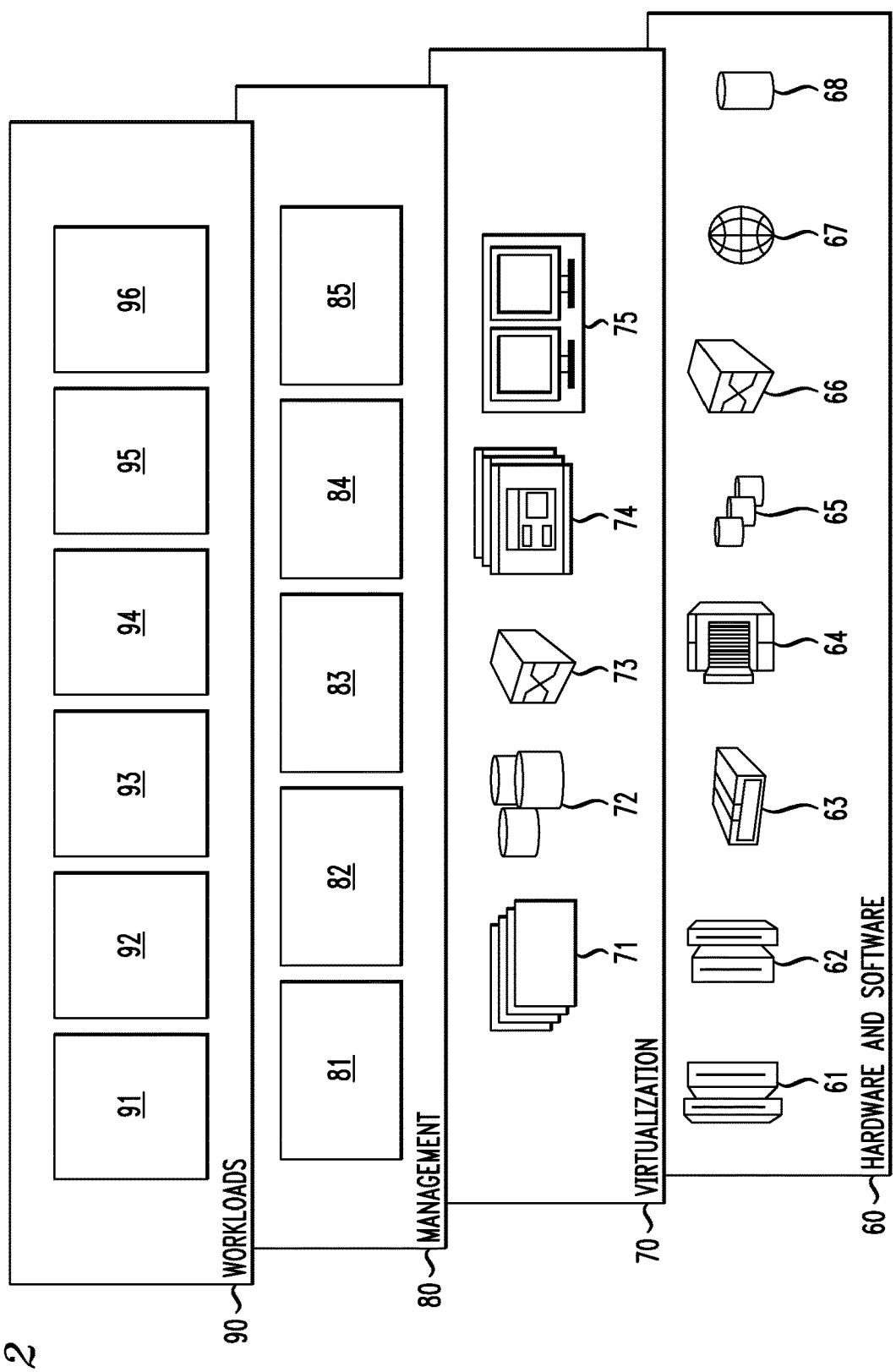
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and personal item assistance 96.

As used herein, an event is related to a personal event (such as a vacation, a wedding, a birthday, an exercise, an entertainment event, and the like), a business event (such as a meeting, a conference, and visiting an office, a bank, or a driving license office), and the like. Non-exhaustive examples of context related to an event include a location, a time/duration of the event, a predicted task associated with the event, an event type (such as a vacation, a wedding, a birthday, an exercise, an entertainment event, a workshop, a meeting, an office visit, and the like), a service (such as banking, an embassy visit, a motor vehicle service, and an immigration service), and the like. Similarly, non-exhaustive examples of items or objects for a travel or trip event that may be forgotten include a computer charger, a phone, a phone charger, a subscriber identity module (SIM card), a power bank, a power converter, a wallet, a suit, an identification card, a document or certificate, a notebook, a photo or picture, and the like.

FIG. 3 is an illustration of an example event scenario 300, in accordance with an example embodiment. Abdi is leaving for the airport to fly to New York from Nairobi for work at a client site. The system detects the upcoming travel event based on Abdi's calendar and generates a list of items that Abdi tends to ignore or forget based on Abdi's historical data. The list may include, for example, a computer charger, a phone, a phone charger, a U.S. SIM card, a power converter, a wallet, a suit, and a U.S. phone charger or power converter. In addition, the system generates the following set of conversational content:

CC={<Did you remember a Kenyan power adaptor?>,
<Do you have your yellow fever card?>,
<Do you have your Green Card?>,
<Do you have your notebook with you?>}

The system identifies Abdi's voice when he speaks to a conversational device requesting to play a song the night before his trip; selects two content items {<Do you have your yellow fever card?>, <Do you have your Green Card?>} based on their "critical" levels and sends these items to the conversational device to play for Abdi; and receives "Yes" for <Do you have your Green Card?> and updates the checklist accordingly. In the morning, when Abdi is about to leave for the airport, the conversational device repeats the questioning for the remaining items. In this example, Abdi ignores the questioning (as detected by sensors in the home). The system therefore sends the conversational content to Abdi's cellular phone or car. When Abdi starts the engine of his car, it triggers the voice-controller of the car to obtain conversational content from the cloud. In this case, the system also warns Abdi by stating the possible implications of not taking various items. The implications are determined, for example, based on an analysis of details regarding the item (such as an importance of the item in relation to the user's travel details, including, for example, details such as destination profile, event profile, and the like) and an analysis of historical implications (such as historical implication data collected over a period of time, including, for example, a list of implications resulting from items being forgotten in the past).

Figure 4:
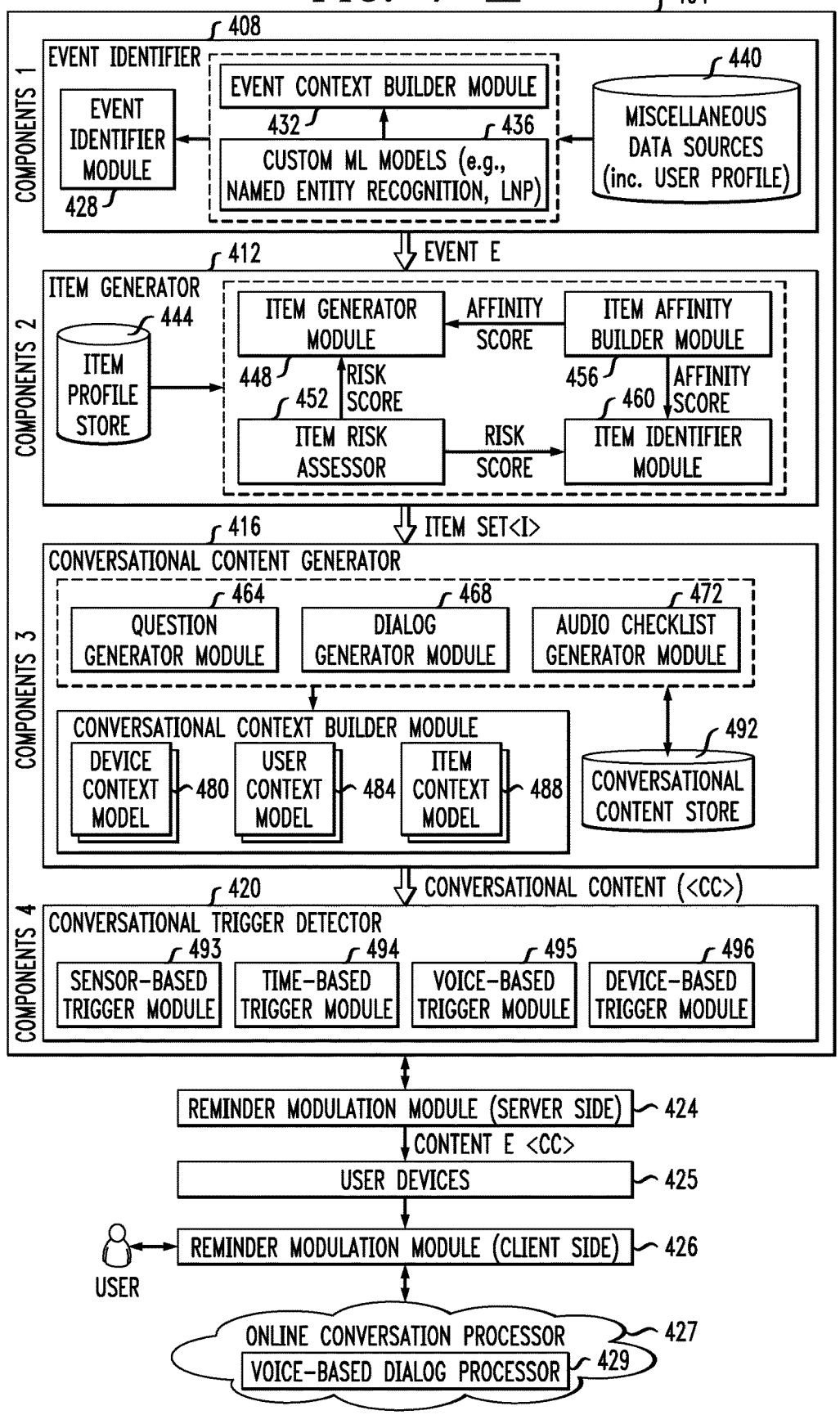
FIG. 4 is a block diagram of a computing system that includes a conversational-based platform for reminding a user or a group of users about items that are related to an event, in accordance with an example embodiment.

FIG. 4 is a block diagram of a computing system 400 that includes a conversational-based platform 404 for reminding a user or a group of users about items that are related to an event, in accordance with an example embodiment. The computing system 400 includes a set of subscribing conversational devices and user communication devices 425 (such as a cellular phone and the like). The conversational-based platform 404 includes an event identifier 408 for identifying a travel or trip event; an item generator 412 for identifying and generating a list of potentially forgotten items pertaining to the event, and for analyzing attributes of each item to characterize the item; a conversational content generator 416 (including for example, a question generator module 464, dialog generator module 468, audio checklist generator module 472, device context model 480, user context model 484, item context model 488, and conversational content store 492) for generating conversational content and determining the contextual aspects of the content based on one or more aspects of the items; and a conversation trigger detector 420 (including for example, a sensor-based trigger module 493, a time-based trigger module 494, a voice-based trigger module 495, and a device-based trigger module 496) for determining or predicting one or more factors for triggering a reminder modulator 424, 426. The item is characterized based on, for example, various affinity measures.

Event Identification

In one example embodiment, the event identifier 408 identifies an event, such as travel or a trip event, for a user or group of users by employing one or more machine learning algorithms. The machine learning algorithms use a plurality of data points such as calendar information (such as an Outlook calendar, a Google calendar, and the like), messages, emails, conversations, and the like to identify upcoming events (such as a workshop, travel to the U.S., and the like). The computing system 400 may also explicitly receive an identification of an upcoming event from the user directly, such as via a graphical user interface (GUI) or speech recognition system.

A customized machine learning model 436, such as a named entity recognition (NER) algorithm, can be employed to extract and classify named entities in text data into pre-defined event categories, such as a name of an organization, a location, and the like. The NER algorithm further uses linguistic grammar-based techniques as well as statistical machine learning models. In one example embodiment, the event identifier 408 uses the event context builder model 432 to learn various contextual information related to the event and semantically characterize the event. If necessary, the event identifier 408 detects and, if necessary, verifies with the user expected travel information obtained from a conversation. The expected travel information is obtained by employing speech recognition, using a conversational device, and the like.

FIG. 5 is a flowchart of an example method 500 for identifying an event, in accordance with an example embodiment. In one example embodiment, the method 500 is performed by the event identifier 428. In the method 500 of FIG. 5, events submitted by a user via, for example, a GUI or speech recognition system are obtained (operation 504). A calendar of a user is searched via the data sources 440 for upcoming events. For example, the calendar may be searched for off-site meetings occurring during the next three days (operation 508). An inbox of a user is searched via the data sources 440 for upcoming events. For example, each email may be parsed and searched for an indication of a conference, an appointment, and the like occurring during the next seven days (operation 512). Text messages of a user are searched via the data sources 440 for upcoming events. For example, each text may be parsed and searched for an indication of an invitation and the like from a friend or colleague for an event that is occurring during the next fourteen days (operation 516).

Generating and Associating Items with Events

The item generator 412 generates a list items associated with an identified event. In one example embodiment, the list includes the identity of a set of items that a user or a group of users needs to bring for an event, a set of tasks to perform for an event, or both. The items are, for example, a toothbrush, a shaver, a special permit or visa, and the like. The list of items is generated based on a trip the user is taking or participating in, a work event, and the like. In one example embodiment, item to item association is learned (such as the user typically takes toothpaste when the user takes a toothbrush, a comb, and a razor on overnight trips) using historical observations from past events.

In one example embodiment, the computing system 400 is trained to determine and generate (via the item generator 412) a list of items <I> through the analysis of an upcoming event E, an identified context C, and a user profile P. The user profile includes, for example, an indication of the person's current state (such as a busy person, an inattentive person, and the like), a person's history (such as a history of forgetting certain items), a list of historical implications due to items being forgotten, and the like. In one example embodiment, the method of generating items further categorizes each item by type and context (such as important, less important, and the like). Various affinity measures between event-item <E, I> and Item-Item <I, I> are determined. For example, association rule learning or decision-tree methods can be used to create the various affinity measures. Alternatively, identified items needed for the predicted or detected event may include items received from a system generated list of items using predictive models, items received from the user (i.e., a user-supplied list of items), items that may be detected from a conversation (such as items identified during an analysis of data from a smart speaker device) or from text messaging, and the like.

In one example embodiment, the item generator 412 generates a list of items based on the characteristics of a travel event, past user history, and the like. The computing system 400 further learns of one or more items (such as items that the user carried during previous travels or trips) and contexts (such as historical contexts of trips, historical characteristics of destinations, events, locations, prior consequences of items being forgotten, and the like) based on historical data. An implication or consequence of an item being forgotten is determined and may be related to time, money, harassment, lost productivity, and the like. As described above, the implication is determined, for example, based on an analysis of a combination of details regarding the items (such as item importance in relation to the user's travel details (including, for example, a destination profile, event profile, and the like) and an analysis of historical implications (such as, for example, historical implication data collected over a period of time)). Moreover, a consequence level is determined based on the computed risk score, as described more fully below. The consequence is also based on contextual information, such as time, money, and the like associated with the user event (available in the first set of user data). If necessary, a percentage value can be computed using association rules for each portion of context information and the percentage value can be attached to the determined implication/consequence (such as a percentage value indicating 50% time implication, 75% lost productivity, and the like).

Note that the user profile P can be constructed from a plurality of user data such as that obtained from the user's calendar, emails, Amazon Echo or Google Home device, smartphones, smart watches, sensors and cameras in the home and car, and the like to build up a profile of the items historically carried by a user, preferences for time and modality for a reminder (such as early in the morning via audio) and which modalities the user responds best to, and the like. The user profile can be enhanced with additional data relating to events and items taken on a trip, and the user's responses to reminders. For example, if a user responds that they would like a reminder to bring a belt on a trip, that need may be retained for a future trip. The user data can further contain historical user travel information, historical user calendar information, historical user behavioral data, a previous history of implications or risks due to forgotten items, a user profile, historical user interactions with devices, and the like.

FIG. 6 is a flowchart of an example method 600 for generating and identifying a list of items associated with an event, in accordance with an example embodiment. In one example embodiment, the method 600 is performed by the item generator 448. An item risk assessor 452 generates a risk score for the item generator 448 and the item affinity builder 456. The item affinity builder 456 generates an affinity score for the item generator 448 and the item identifier 460. The item generator 448 generates a list of items needed for a given travel context, event context, and the like for the user. The item identifier 460 identifies, for a given travel context, event context, and the like, an item(s) from a list of existing items useful for the user. As described above, association rule learning or decision-tree methods can be used to create the various affinity measures.

In one example embodiment, estimates of the probability that certain items will be forgotten can be gleaned from observations of other users and their proclivity to forget the items, potentially weighted based on a degree of similarity of the other users to the given user. An estimate of the cost of forgetting a given item can be deduced by considering the average cost of trips taken when the item is lost versus when the item is not lost.

In one example embodiment, the probability of forgetting an item is estimated by using population averages for the item being forgotten and the given user's propensity to forget items in general compared to the population at large. For example, the probability of a typical person in the population forgetting to bring a toothbrush on a typical trip involving an overnight stay might be 5%, but the given individual in question may be observed to be twice as forgetful as a member of the general public. As a result, the system will estimate the user's likelihood to forget a toothbrush as 2×5%=10%.

The item generator 448 maps the requisite items needed for an event using event categorization (for categories such as a meeting, a conference, a class, and the like). For example, a typical trip to the U.S. might have the following requirements:

Valid passport
Entry visa
Clothing for duration of the trip
1 suit for formal event
Sufficient money and credit cards
Departure at the correct time
Transportation to/from airport
Accommodations In one example embodiment, each item may be represented on a knowledge graph where the event is associated with a set of requirements, as described more fully below in conjunction with FIG. 7. A knowledge graph can be constructed from semi-structured and unstructured data such as emails, a calendar, and the like coupled with external domain data from websites such as that of custom and immigration websites, the U.S. Embassy, travel websites, and the like. This data is then searched and retrieved by identifying the relevant nodes in the knowledge graph and then using the user data to add/remove necessary items from the list (such as, if user is a U.S. citizen, they do not require a U.S. visa).

In the example method 600 of FIG. 6, a first set of user data is received (operation 604). For example, historical user travel information, user calendar history, historical user behavioral data, a previous history of implications or risks due to forgotten items, a user profile, historical interactions with devices, and the like may be obtained. At least one event, such as a travel or trip event, is identified using the associated contextual information in the first set of user data (operation 608). Item selection factors are predicted based on the identified event and the first set of user data (operation 612). For example, the degree D of forgetting an item, the importance level, the priority level, the sensitivity, the context, affinity measures, and the like may be predicted. These criteria are determined, for example, by machine learning algorithms. In one example embodiment, a semantics-based technique is employed for item selection and prediction. A list of items for the identified travel event is determined based on the predicted item selection factors and the first set of user data (operation 616).

FIG. 7 is an illustration of an example dataflow 700 for generating a knowledge graph 704 for mapping events and tasks, in accordance with an example embodiment. The associated items can be generated from user to-do lists (both digital and analog), messages on messaging platforms (such as WhatsApp®, Telegram®, and the like), via audio platforms (such as audio interaction with conversational devices, or audio-enabled devices like smartphones, computing devices, and smart watches), and the like. The audio interactions can be monitored and recorded to determine the items the user will be using, taking with them on a trip, and the like. This can occur while the use is preparing for the event (such as while packing, writing an email, creating a to-do list, and the like). In the example dataflow 700 of FIG. 7, the knowledge graph 704 is generated from unstructured/structured content 708, a domain ontology 712, a relational database 716, external domain data 720, and user data 724.

Generating Conversational Content

The computing system 400 also generates contextualized conversational content. In one example embodiment, the contextualized conversational content corresponds to items on the list of items identified for the event by employing custom trained machine learning models and the like. The conversational content is, for example, a list of questions (such as one or more questions for each item), a text-enabled or voice-enabled checklist, a dialog, and the like. The method of generating contextualized conversational content further includes, for example, evaluating one or more effective strategies to best engage with users for some selected items. In one example scenario, a semantics-based technique is employed to tag generated conversational content with a priority level, an importance level, a time aspect, a sensitivity, an appropriateness in connection with when to trigger the conversation (such as some questions in front of a child for some items may not be appropriate), and the like. This can be done in two steps. First, each of the generated conversational content items is analyzed (such as using NLP or any relevant content analytics algorithm) to understand the type and nature of the content item. Second, based on the characteristics of the travel or event to which the content items are generated, properties of the content item such as a priority level (such as 3<High>, 2<Medium>, 1<Low>, and 0<Negligible>), an importance level (computed based on the priority level), a time (suggesting when to trigger the conversational content to the user), and the like are inferred. As an example, consider generating a few simple conversational elements from travel event E (such as a calendar entry of "Travel to Dubai for a client meeting on April 30") and a list of items I (such as {Suit, Charger}) for the user Abdi. The conversational elements may include:
(a) Abdi, Are you aware of your up-coming trip to Dubai, which is scheduled for April 30?
(b) Abdi, Please say "Yes", if you already packed your "Blue Suit"
(c) Abdi, May I order a power converter for you? It would arrive tomorrow."

In the method below, a priority tagging mode, an NER model, a response strategy, and a dialogue model are used to identify the correct response strategy and correct response to return to the user:
1 Input: user_response, user_profile, time, list_reminder, priority_tag_model, named_entity_recog_model, response_strategy_model, dialogue_model
2 key_dialogue_entities←apply named_entity_recog_model to user_response
3 key_priority_topic←apply priority_tag_model to key_dialogue_entities, list_reminder, time
4 response_strategy_list←apply response_strategy_model to dialogue_model, user_profile
5 if response_strategy_list>0
6 preferred_response_strategy←find highest confidence_score
7 else preferred_response_strategy←request_user_to_repeat_sentence
8 response_to_user←apply user_profile, preferred_response_strategy to dialogue_model
9 return response_to_user In one example embodiment, the above pseudocode algorithm outputs (see line 9) the response to the user (response_to_user) given the various machine learning models (user_profile, priority_tag_model, named_entity_recog_model, response_strategy_model, dialogue model, and the like) and other input parameters (user_response, user_profile, time, list_reminder, and the like) as input (see line 1). The model named_entity_recog_model is applied to the received user response (user_response) to determine dialogue entities key_dialogue_entities (see line 2), which will be used to determine the key_priority_topic. The priority_tag_model model is applied to the tuple <key_dialogue_entities, list_reminder, time> to determine the key_priority_topic (see line 3).

The pseudocode algorithm determines the list of response strategies response_strategy_list by applying the response_strategy_model mode to the pair <dialogue_model, user_profile> (see line 4). A check is then performed to determine if the determined list of response strategies contains at least one response strategy (see line 5). If the list of response strategies contains at least one response strategy, the pseudocode algorithm finds the highest confidence_score, which will be selected as preferred_response_strategy (see line 6).

If the list of response strategies contains no response strategy, the pseudocode algorithm triggers the contextual item reminder assistant system to engage with the user (the preferred_response_strategy←request_user_to_repeat_sentence; see line 7). The pseudocode algorithm determines the response to the user by applying both the user profile and preferred response strategy to the dialogue model (see line 8). The final value of the response is then returned to the user (see line 9).

In one example embodiment, the computing system 400 further detects an item from a conversation (using, for example, speech/voice recognition methods and natural language processing) and triggers the conversational content generator 416 to generate the conversation. For example, the conversational content generator 416 may output conversation contents such as:
System: "Did I hear you say you need a 'belt' for your upcoming Dubai trip?"
User: "Yes"
System: "Do you want to include a belt in your list of items to be reminded of?"

In one example embodiment, the generation of conversational content further employs a variant of question generation approaches such as template-based (that helps to produce what/why/how types of questions for conversation), syntax-based or semantics-based, and the like.

Contextual Conversation Trigger Detection

In one embodiment, the computing system 400 employs a rule-based algorithm, a learning-based algorithm, or both to determine one or more triggers that will be used to auto-trigger a conversation with a user pertaining to item reminders. In one example embodiment, the method of determining one or more triggers further comprises sensing the user based on proximity sensors (such as sensors available on the user's mobile phone), based on proximity to a geo-fencing region, and the like; learning a trigger indicator based on the attributes of items such as sensitivity, characteristics, context (such as a location, a time of the day, a crowd-density, and the like); and detecting the voice/sound of the user while the user is speaking to a voice-controlled device (such as the user requesting a virtual assistant to play a song), or using user-specified trigger events (such as an electronic to-do list) or real-time instrumentation of user interaction. The method of determining one or more conversational triggers may further include determining the context regarding when to auto-trigger the conversation based on conversation sensitivity and appropriateness. For example, a user's voice may be identified when the user speaks to a virtual assistant requesting to play a song the night before a trip.

Auto-Triggering Conversation

Figure 8:
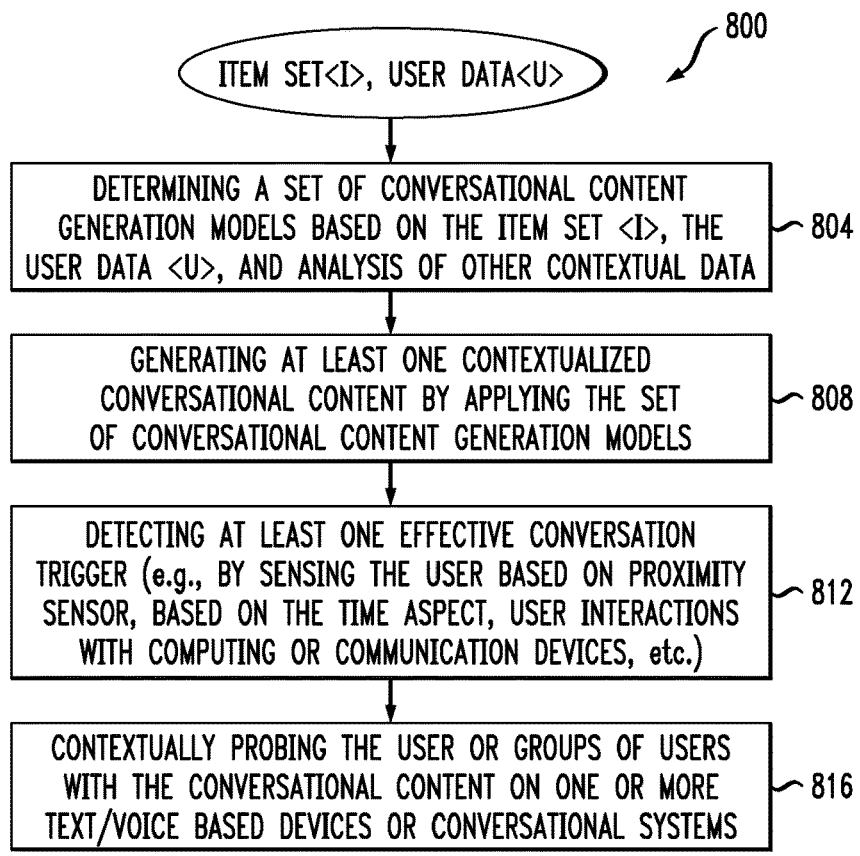
FIG. 8 is a flowchart of an example method for auto-triggering a conversation, in accordance with an example embodiment.

FIG. 8 is a flowchart of an example method 800 for auto-triggering a conversation, in accordance with an example embodiment. In the example method 800 of FIG. 8, an item set <I> and user data <U> are received and a set of conversational content generation models is generated based on the item set <I>, the user data <U>, and an analysis of other contextual data (operation 804). Contextualized conversational content is generated by applying the set of conversational content generation models (operation 808). At least one effective conversation trigger is detected (operation 812). For example, an effective conversation trigger may be detected by sensing the user based on a proximity sensor, based on a time aspect, based on user interactions with computing or communication devices, and the like. A user or group of users are then probed for contextual information by displaying or playing the conversational content on a user device or conversational system (operation 816).

Re-Routing of Items

In one example embodiment, as described above, the system creates amelioration actions that can dynamically trigger the routing of forgotten or replacement items, such as identifying a neighbor of the user to deliver or transport an item, identify a replacement item, arrange transportation and delivery options by a courier (such as picking up and delivering the item), and the like. In one example embodiment, for items that have been forgotten, mediation to find a route to either deliver the item to the user or find a replacement item is computed. In the former case, individuals in the user's network who are in the vicinity of where the forgotten item was left, for example, can be contacted. If available, they can pick up the item while en route to where the user is currently located. The individuals are identified based on the user's contacts list (such as phone directory, email, Facebook account, and the like) and are ranked, for example, based on the distance from the user's home location upon arrival, based on the social connection with the user (such as individuals with few interactions with the user would be ranked lower than other users), and the like. Notifications are then sent to the individual asking whether they would be able to drop off the forgotten item. In another scenario, data on a courier service (such as DHL, Uber, Flight, and the like) is aggregated and evaluated to determine their availability and cost for delivering the item. The information is then presented to the user.

In one example embodiment, data from stores, such as online stores and physical stores, are mined to find the availability of a forgotten item and options are presented to the user describing where they can order the item for delivery to their location, where they can pick up the item, and the like. This may be presented on a computing device, via a conversational system, and the like.

Figure 9:
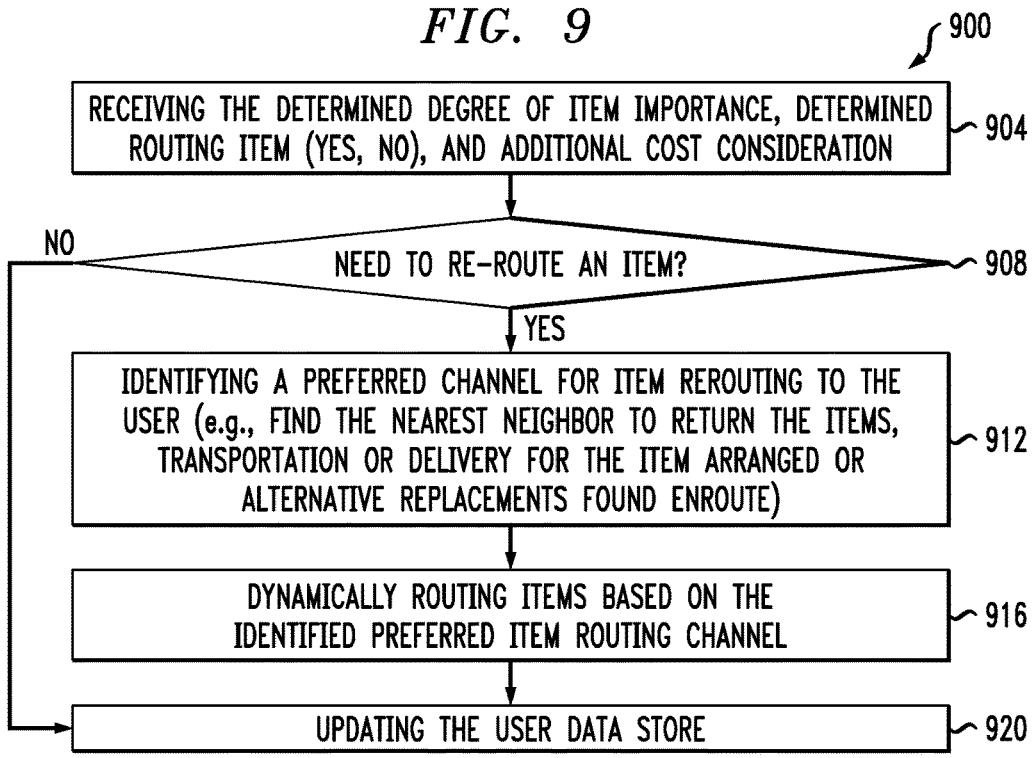
FIG. 9 is a flowchart of an example method for an auto-routing of items, in accordance with an example embodiment.

FIG. 9 is a flowchart of an example method 900 for an auto-routing of items, in accordance with an example embodiment. The determined degree of importance, the determined routing item, and any additional cost considerations are received (operation 904). A determination is then made as to whether an item needs to be rerouted based on various conditions (operation 908). For example, a condition may be based on a cost (and time) consideration, a condition may be based on a user preference (based, for example, on item importance), and the like. If the item does not need to be rerouted, the method 900 proceeds with operation 920; otherwise, a preferred routing channel for item rerouting to the user is identified (operation 912). For example, the nearest neighbor available to return the item, an available transportation or delivery service, or replacements for the item are determined based on, for example, cost. The item(s) are then routed based on the identified preferred routing channel (operation 916). The stored user data is updated accordingly (operation 920).

In one example embodiment, the system provides warnings to the user via a GUI, wherein the warnings are in the form, for example, of changing the color of a portion of a GUI, vibrating a computing device, and the like based on a detected concern level (such as the user is still at home at 2 pm when a flight is at 3 pm) or based on certain items not being checked off an item list. In the instance where the risk-level is above a certain threshold, the system triggers the amelioration actions described above. The GUI can be configured to alert, trigger, and notify the relevant user of the appropriate actions to take or to provide feedback to the user on the user's computing device. For example, a notification of "DO NOT FORGET SUIT" or "RESCHEDULE FLIGHT" may be displayed to the user on a GUI.

Figure 10:
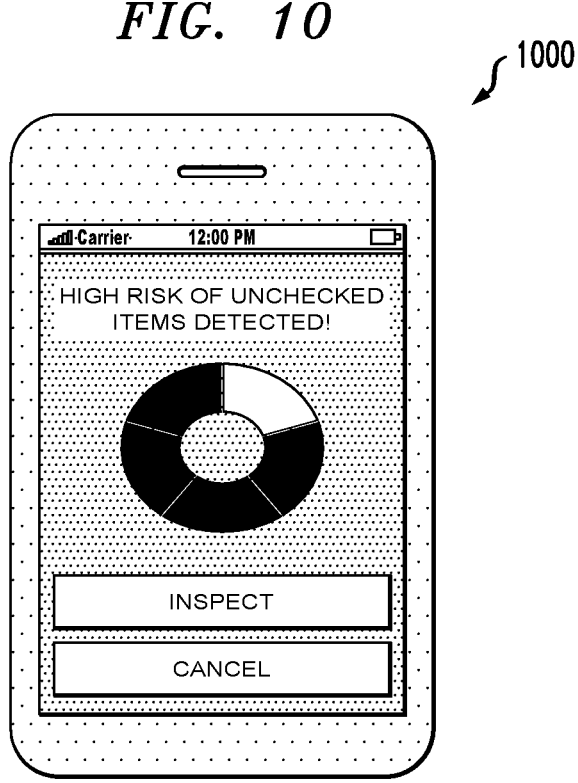
FIG. 10 is an illustration of an example GUI showing a notification of a high-risk scenario, in accordance with an example embodiment.

FIG. 10 is an illustration of an example GUI 1000 showing a notification of a high-risk scenario. In the GUI 1000, the user is notified, using a multi-dimensional risk array, that they might not be prepared or have unchecked/forgotten items, in accordance with an example embodiment. It allows the user to inspect the list and select ameliorating actions.

Figure 11:
FIG. 11 is an illustration of an example GUI on a smart watch showing a notification of a high-risk scenario, in accordance with an example embodiment.
Figure 12:
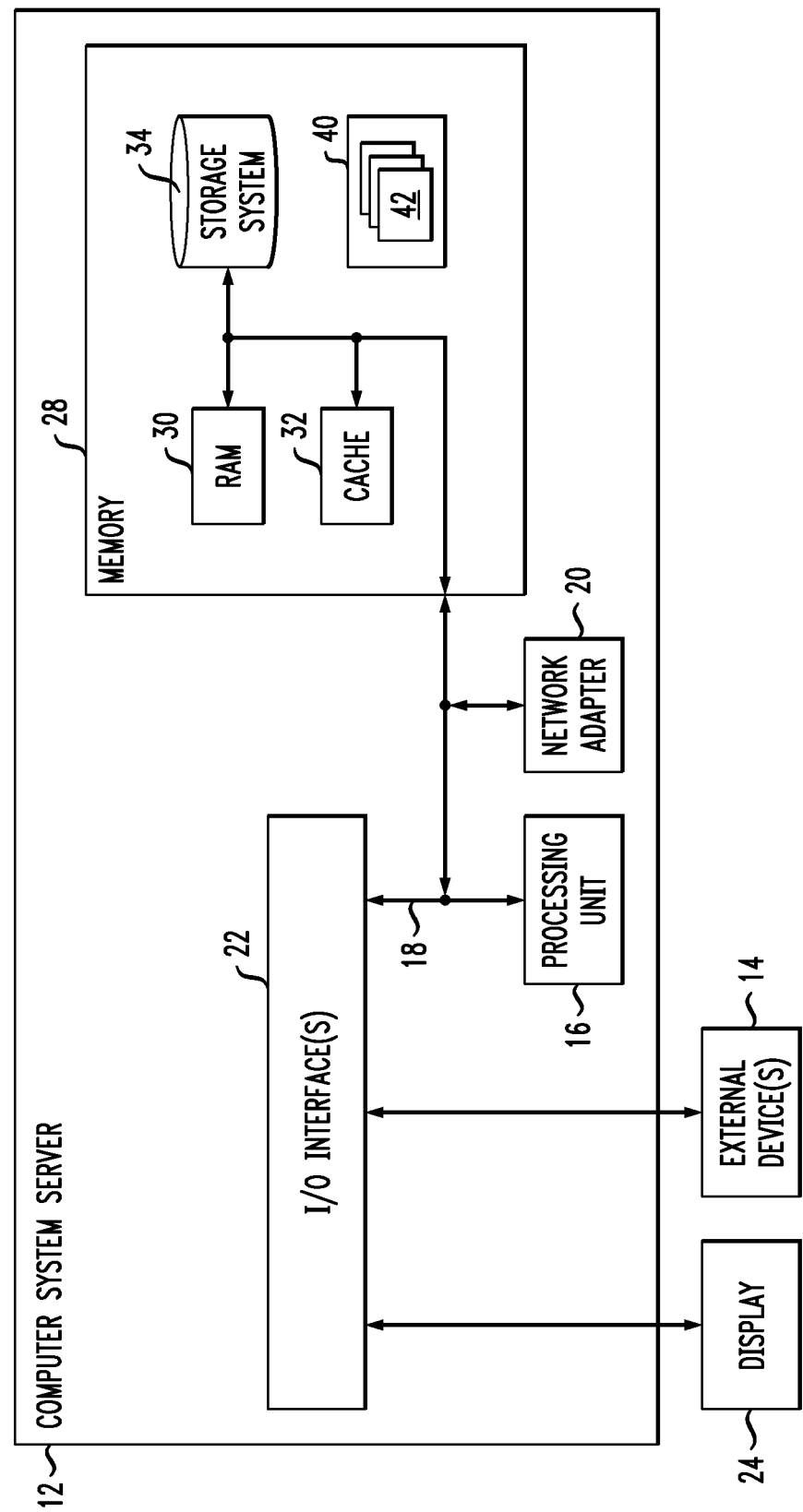
FIG. 12 depicts a computer system that may be useful in implementing one or more aspects and/or elements of the invention, also representative of a cloud computing node according to an embodiment of the present invention.

The multidimensional array is an array that has more than two dimensions. A two-dimensional array uses two subscripts for indexing, namely, a row index and a column index. A multidimensional array uses additional subscripts for indexing. For example, a three-dimensional array uses three subscripts, namely, a rank array dimension 1 (such as the row), dimension 2 (such as the column); and dimension 3 (such as a page). As dimensions are added, corresponding subscripts are added. For example, a four-dimensional array has four subscripts: the first two reference a row-column pair; and the second two access third and fourth dimensions of data. A dimension of the multidimensional risk array can include, for example, information related to items, travels, events, job, health, relationship, cost, and the like. Another dimension can be a risk of a combination of two or more items or health issues. Another dimension can be an indication of whether entry at a point of entry to a destination target (such as a country, an event entrance, and the like) is denied. FIG. 11 is an illustration of an example GUI 1100 on a smart watch showing a notification of a high-risk scenario, in accordance with an example embodiment. In the illustration of FIG. 9, the user is notified that they might not be prepared or have unchecked/forgotten items.

Given the discussion thus far, it will be appreciated that, in general terms, historical data is used to understand, for a given user, what items are typically useful but often forgotten for a given event. Suitable ameliorating processes are automatically triggered once an item is recognized to be lost. Novel employment of machine learning (ML) algorithms or techniques (such as, predictive models) to (a) estimate the cost of forgetting an item, (b) estimate the probability that certain items will be forgotten, and (c) compute the risk associated with losing such items is disclosed. Machine learning models are used to generate contextualized conversational content as an effective and natural way of engaging with users by issuing reminders of items that might be forgotten for a given event and to determine at least one conversational trigger for issuing contextualized conversations, issuing reminders to a user, and controlling user devices based on contextual information (such as priority level, location, a time/duration of the event, a predicted task associated with the event, an event type, a service, and the like) related to the conversational content, an analysis of a user's feedback, or both.

Given the discussion thus far, it will be appreciated that, in general terms, an exemplary method, according to an aspect of the invention, includes the step of identifying the upcoming event based on user data (440, 604-608); obtaining context for determining a list of items useful for the upcoming event (604-608); determining, using the context, the list of items for the identified upcoming event (616); determining item reminder enhancement factors in response to the upcoming event and the determined list of items (612); determining content selection models based on the context, the user data, and the item reminder enhancement factors (804); generating conversational content for engaging the user or group of users by applying the content selection models to a plurality of potential content (808); determining a conversation trigger signal (420, 440, 812); and presenting the conversational content to the user via a computing device in response to receiving the conversation trigger signal (420, 816).

In one example embodiment, the determining the list of items further comprises receiving an identity of one or more items from a plurality of sources based on one or more of a signal sent from an item, a list of items generated by a system (412) by using predictive models, a user-supplied list of items, and one or more items detected during conversation (816). In one example embodiment, a likelihood that the user or the group of users will forget an item on the list of items is learned; an aspect of context-sensitive implications or risks associated with the item on the list of items when forgotten is determined; and a degree of item importance based on the context-sensitive implications or risks is determined.

In one example embodiment, the determining the conversation trigger signal is performed based on one or more of detecting a user interaction with a specified computing device, sensing the user based on a proximity sensor, sensing the user based on proximity to a geo-fence region, detecting an expiration of a time trigger, receiving text based on voice recognition, and analyzing attributes of an item on the list of items (812). In one example embodiment, the determining the conversation trigger signal further comprises: learning a trigger indicator based on one or more attributes of an item on the list of items; and detecting the trigger indicator based on one or more of a user speaking to a voice-controlled device, a user-specified trigger event, and a real-time instrumentation of user interaction (420, 812).

In one example embodiment, the determining the conversation trigger signal further comprises determining context regarding when to auto-trigger a conversation based on conversation sensitivity and appropriateness (420, 812). In one example embodiment, at least one model to rank the potential content according to attributes of an item on the list of items and the user data is established and one or more forgotten items are dynamically routed based on an analysis of the degree of item importance (904-916). In one example embodiment, a cost of forgetting at least one item on the list of items is estimated. In one example embodiment, the identifying the upcoming event further comprises employing a machine learning algorithm (436) using a plurality of data points, the plurality of data points comprising one or more of calendar information, a message, an email, and a conversation (500).

In one example embodiment, the user data comprises: a user profile (440), the user profile comprising data obtained from a user's calendar, an email, and a user device; and one or more of a profile of items historically carried by a user, a preference for time and modality of reminder, a user's response to a reminder, historical user travel information, historical user calendar information, historical user behavioral data, a previous history of implications or risks due to forgotten items, and historical user interactions with a user device. In one example embodiment, the identifying the upcoming event further comprises obtaining a first set of user data (604); and predicting at least one item selection factor based on the identified upcoming event and the first set of user data, wherein the identification of the upcoming event is based on associated contextual information in the first set of user data (612). In one example embodiment, the at least one item selection factor is a degree of forgetting an item, an importance level, a priority level, a sensitivity, a first context, and an affinity measure (612).

In one example embodiment, the list of items is determined based on the predicted item selection factors and the first set of user data (616). In one example embodiment, the first set of user data comprises one or more of historical user travel information, user calendar history, historical user behavioral data, a previous history of implications or risks due to a forgotten item, a user profile, and historical interactions with a user device (604). In one example embodiment, the generating the conversational content further comprises: obtaining an item set <I> and user data <U>; and generating a set of conversational content generation models based on the item set <I>, the user data <U>, and an analysis of other contextual data, wherein the conversational content is generated by applying the set of conversational content generation models (804). In one example embodiment, an amelioration action is determined, the amelioration action being one or more of dynamically triggering the routing of a forgotten item (916), identifying a replacement item (912), identifying an individual to transport the forgotten item (912), and arranging transportation and delivery options by a courier for the forgotten item (912).

In one example embodiment, a computer implements a machine learning system, said computer comprising: a memory; and at least one processor, coupled to said memory, and operative to perform operations comprising: identifying the upcoming event based on user data (440, 604-608); obtaining context for determining a list of items useful for the upcoming event (604-608); determining, using the context, the list of items for the identified upcoming event (616); determining item reminder enhancement factors in response to the upcoming event and the determined list of items (612); determining content selection models based on the context, the user data, and the item reminder enhancement factors (804); generating conversational content for engaging the user or group of users by applying the content selection models to a plurality of potential content (808); determining a conversation trigger signal (420, 440, 812); and presenting the conversational content to the user via a computing device in response to receiving the conversation trigger signal (420, 816).

In one example embodiment, a non-transitory computer readable medium comprises computer executable instructions which when executed by a computer cause the computer to perform the method of: identifying the upcoming event based on user data (440, 604-608); obtaining context for determining a list of items useful for the upcoming event (604-608); determining, using the context, the list of items for the identified upcoming event (616); determining item reminder enhancement factors in response to the upcoming event and the determined list of items (612); determining content selection models based on the context, the user data, and the item reminder enhancement factors (804); generating conversational content for engaging the user or group of users by applying the content selection models to a plurality of potential content (808); determining a conversation trigger signal (420, 440, 812); and presenting the conversational content to the user via a computing device in response to receiving the conversation trigger signal (420, 816).

One or more embodiments of the invention, or elements thereof, can be implemented in the form of an apparatus including a memory and at least one processor that is coupled to the memory and operative to perform exemplary method steps. FIG. 10 depicts a computer system that may be useful in implementing one or more aspects and/or elements of the invention, also representative of a cloud computing node according to an embodiment of the present invention. Referring now to FIG. 10, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 10, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 10) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for reminding at least one user about one or more items related to an upcoming event, the method comprising:

training a computerized item machine learning system to determine a likelihood that the at least one user will forget an item on a list of items based on information from an item profile store;

training a computerized conversational machine learning system to determine a conversation trigger signal based on attributes of the items, the attributes comprising sensitivity, characteristics and context;

determining, using the computerized item machine learning system, an aspect of context-sensitive implications associated with a forgotten item on the list of items;

determining, using the computerized item machine learning system, a degree of item importance based on the context-sensitive implications using a semantics-based technique;

identifying, using a computerized event machine learning system, the upcoming event based on user data and an event context builder model;

obtaining context for determining the list of items useful for the upcoming event;

determining, using the context and stored historical user data, the list of items for the identified upcoming event using the learned likelihoods, the determined degree of item importance, and by learning item to item association using historical observations from past events and by analyzing the upcoming event, the obtained context, and a user profile using the computerized item machine learning system;

determining item reminder enhancement factors in response to the upcoming event and the determined list of items;

determining content selection models based on the context, the user data, and the item reminder enhancement factors;

generating conversational content, using the computerized conversational machine learning system, for engaging the at least one user by obtaining an item set <I> and user data <U>;

training a set of conversational content generation models based on the item set <I>, the user data <U>, and an analysis of other contextual data;

generating potential conversational content by applying the set of conversational content generation models; and applying the content selection models to the potential conversational content;

determining, using the computerized conversational machine learning system, the conversation trigger signal based on contextual information related to the conversational content and an analysis of user feedback, wherein the determining of the conversation trigger signal is performed based on sensing the user using a proximity sensor; and presenting the conversational content to the user via a computing device in response to receiving the conversation trigger signal.

2. The method of claim 1, wherein the determining the list of items further comprises receiving an identity of one or more items from a plurality of sources based on one or more of a signal sent from an item, a list of items generated by a system by using predictive models, a user-supplied list of items, and one or more items detected during conversation.

3. The method of claim 1, wherein the determining the conversation trigger signal is performed based on one or more of detecting a user interaction with a specified computing device, sensing the user based on proximity to a geo-fence region, detecting an expiration of a time trigger, receiving text based on voice recognition, and analyzing attributes of an item on the list of items.

4. The method of claim 1, wherein the determining the conversation trigger signal further comprises
detecting the conversation trigger signal based on one or more of a user speaking to a voice-controlled device, a user-specified trigger event, and a real-time instrumentation of user interaction.

5. The method of claim 1, wherein the determining the conversation trigger signal further comprises determining context regarding when to auto-trigger a conversation based on conversation sensitivity and appropriateness.

6. The method of claim 1, further comprising establishing at least one model to rank the potential conversational content according to attributes of the item on the list of items and the user data, wherein the conversational content and the potential conversational content is content designed to conduct a conversation with the at least one user.

7. The method of claim 1, further comprising dynamic routing of one or more forgotten items based on an analysis of the degree of item importance.

8. The method of claim 1, further comprising estimating a cost of forgetting at least one item on the list of items.

9. The method of claim 1, wherein the identifying the upcoming event further comprises employing a machine learning algorithm using a plurality of data points, the plurality of data points comprising one or more of calendar information, a message, an email, and a conversation.

10. The method of claim 1, wherein the user data comprises:
the user profile, the user profile comprising data obtained from a user's calendar, an email, and a user device; and
one or more of a profile of items historically carried by a user, a preference for time and modality of reminder, a user's response to a reminder, historical user travel information, historical user calendar information, historical user behavioral data, a previous history of implications or risks due to forgotten items, and historical user interactions with a user device.

11. The method of claim 1, wherein the identifying the upcoming event further comprises obtaining a first set of user data; and predicting, using the computerized item machine learning system, at least one item selection factor based on the identified upcoming event and the first set of user data, wherein the identification of the upcoming event is based on associated contextual information in the first set of user data.

12. The method of claim 11, wherein the at least one item selection factor is a degree of forgetting an item, an importance level, a priority level, a sensitivity, a first context, and an affinity measure.

13. The method of claim 11, wherein the list of items is determined based on the predicted item selection factors and the first set of user data.

14. The method of claim 11, wherein the first set of user data comprises one or more of historical user travel information, user calendar history, historical user behavioral data, a previous history of implications or risks due to a forgotten item, a user profile, and historical interactions with a user device.

15. The method of claim 1, further comprising determining an amelioration action, the amelioration action being one or more of dynamically triggering a routing of a forgotten item, identifying a replacement item, identifying an individual to transport the forgotten item, and arranging transportation and delivery options by a courier for the forgotten item.

16. The method of claim 1, wherein the determining the conversation trigger signal further comprises performing computerized voice recognition to determine text indicative of the conversation trigger signal.

17. A computer implementing a machine learning system, said computer comprising:
a memory; and
at least one processor, coupled to said memory, and operative to perform operations comprising:
training a computerized item machine learning system to determine a likelihood that at least one user will forget an item on a list of items based on information from an item profile store;
training the computerized item machine learning system to determine a conversation trigger signal based on attributes of the items, the attributes comprising sensitivity, characteristics and context;
determining, using the computerized item machine learning system, an aspect of context-sensitive implications associated with a forgotten item on the list of items;

determining, using the computerized item machine learning system, a degree of item importance based on the context-sensitive implications using a semantics-based technique;
identifying, using a computerized event machine learning system, the upcoming event based on user data and an event context builder model;
obtaining context for determining the list of items useful for the upcoming event;
determining, using the context and stored historical user data, the list of items for the identified upcoming event using the likelihoods, the determined degree of item importance, and by learning item to item association using historical observations from past events and by analyzing the upcoming event, the obtained context, and a user profile using the computerized item machine learning system;
determining item reminder enhancement factors in response to the upcoming event and the determined list of items;
determining content selection models based on the context, the user data, and the item reminder enhancement factors;
generating conversational content, using the computerized conversational machine learning system, for engaging the at least one user by obtaining an item set <I> and user data <U>;
training a set of conversational content generation models based on the item set <I>, the user data <U>, and an analysis of other contextual data;
generating potential conversational content by applying the set of conversational content generation models; and applying the content selection models to the potential conversational content;
determining, using the computerized conversational machine learning system, the conversation trigger signal based on contextual information related to the conversational content and an analysis of user feedback, wherein the determining of the conversation trigger signal is performed based on sensing the user using a proximity sensor; and
presenting the conversational content to the user via a computing device in response to receiving the conversation trigger signal.

18. A non-transitory computer readable medium comprising computer executable instructions which when executed by a computer cause the computer to perform the method of:
training a computerized item machine learning system to determine a likelihood that at least one user will forget an item on a list of items based on information from an item profile store;
training the computerized item machine learning system to determine a conversation trigger signal based on attributes of the items, the attributes comprising sensitivity, characteristics and context;
determining, using the computerized item machine learning system, an aspect of context-sensitive implications associated with a forgotten item on the list of items;
determining, using the computerized item machine learning system, a degree of item importance based on the context-sensitive implications using a semantics-based technique;
identifying, using a computerized event machine learning system, the upcoming event based on user data and an event context builder model;
obtaining context for determining the list of items useful for the upcoming event;
determining, using the context and stored historical user data, the list of items for the identified upcoming event using the learned likelihoods, the determined degree of item importance, and by learning item to item association using historical observations from past events and by analyzing the upcoming event, the obtained context, and a user profile using the computerized item machine learning system;
determining item reminder enhancement factors in response to the upcoming event and the determined list of items;
determining content selection models based on the context, the user data, and the item reminder enhancement factors;
generating conversational content, using the computerized conversational machine learning system, for engaging the at least one user by obtaining an item set <I> and user data <U>; training a set of conversational content generation models based on the item set <I>, the user data <U>, and an analysis of other contextual data;
generating potential conversational content by applying the set of conversational content generation models; and applying the content selection models to the potential conversational content;
determining, using the computerized conversational machine learning system, the conversation trigger signal based on contextual information related to the conversational content and an analysis of user feedback, wherein the determining of the conversation trigger signal is performed based on sensing the user using a proximity sensor; and
presenting the conversational content to the user via a computing device in response to receiving the conversation trigger signal.

\* \* \* \* \*